No. 733,407. Patented July 14, 1903.

UNITED STATES PATENT OFFICE.

KONRAD N. LUNDBLAD, OF ÖREBRO, SWEDEN.

COMPOSITION OF MATTER.

SPECIFICATION forming part of Letters Patent No. 733,407, dated July 14, 1903.

Application filed November 26, 1902. Serial No. 132,973. (No specimens.)

*To all whom it may concern:*

Be it known that I, KONRAD N. LUNDBLAD, a subject of Oscar II, King of Sweden and Norway, residing at Örebro, in the Province of Örebro, Sweden, have invented a new and useful composition of matter to be used for softening, preserving, and preventing from cracking machine-belts of leather and also for preventing such belts from slipping on pulleys which they are driving, of which the following is a specification.

My composition consists of the following ingredients, combined in the proportions stated, viz: linseed-oil, two gallons; lard-oil, two gallons; rosin, fifty pounds; vaseline, eleven pounds. These ingredients are to be thoroughly mingled by agitation, at the same time applying such heat thereto as may be requisite therefor.

The above-described belt-dressing should be applied by being spread evenly onto the flat surfaces of the belts and then be allowed to be absorbed thereby.

This dressing will prolong the wear of belts very materially and at the same time prevent them from slipping on the pulleys they are driving.

What I claim, and desire to secure by Letters Patent of the United States, is—

1. The herein-described composition of matter consisting of linseed-oil, lard-oil, rosin and vaseline, substantially as described and for the purpose specified.

2. The herein-described composition of matter for softening, preserving and preventing from slipping on pulleys which they are driving, machine-belts of leather, consisting of linseed-oil, two gallons, lard-oil two gallons, rosin fifty pounds and vaseline eleven pounds, substantially as described.

In testimony whereof I have signed my name to this specification in the presence of two subscribing witnesses.

KONRAD N. LUNDBLAD.

Witnesses:
K. HEINEKE,
O. A. FORSCTH.